Patented Nov. 9, 1937

2,098,643

UNITED STATES PATENT OFFICE 2,098,643

WATER-SOLUBLE AZO-DYESTUFFS

Erich Fischer, Bad Soden-on-Taunus, and Richard Huss, Frankfort-on-the-Main, Germany, assignors to General Aniline Works, Inc., New York, N. Y., a corporation of Delaware No Drawing. Application June 26, 1936, Serial No. 87,586. In Germany June 29, 1935

5 Claims. (Cl. 260—76)

The present invention relates to water-soluble azo-dyestuffs; more particularly it relates to dyestuffs of the following general formula:

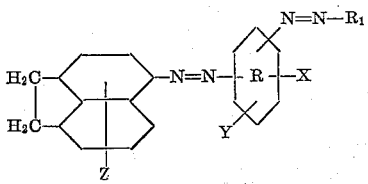

wherein the benzene nucleus R contains at least two hydroxy groups, $R_1$ means a radical of the benzene, naphthalene, diphenyl or acenaphthene series, X stands for one of the group consisting of hydrogen and the radical $-N=N-R_1$, Y for one of the group consisting of hydrogen, sulfonic acid and carboxylic acid, Z stands for one of the group consisting of hydrogen and sulfonic acid, and wherein the dyestuff contains at least one sulfonic acid group.

We have found that valuable azo-dyestuffs may be obtained by combining simultaneously or successively 1 mol. of a dihydroxy- or trihydroxy compound of the benzene series, capable of being coupled at least twice, with at least 2 mols. of a diazo-compound or at least 1 mol. of one diazo-compound and at least 1 mol. of another, at least one of these compounds being a 5-diazo-acenaphthene; the finished dyestuff must contain at least one sulfonic acid group and, if desired, may be treated with an oxidizing agent or an agent yielding a metal.

As middle components there may be used, for instance, pyrocatechol, resorcinol, pyrogallol, phloroglucinol and their derivatives capable of being coupled at least twice.

The new dyestuffs have good properties of fastness and are especially adapted for dyeing leather. As regards their fastness to acids, they surpass the known disazo-dyestuffs obtainable by combining 1 mol. of diazotized 1-aminonaphthalene-4-sulfonic acid and 1 mol. of any diazo-component with 1 mol. of 1,3-dihydroxybenzene. When compared with the tris-azo-dyestuffs obtainable by the process of French Patent No. 745,563, the new dyestuffs are distinguished by an essentially better fastness to sodium carbonate. Furthermore, they surpass in their fastness to acids the cupriferous dyestuff which is obtainable by treating the water-soluble dis-azo-dyestuff from 1 mol. of diazotized 1-amino-naphthalene-4-sulfonic acid, 1 mol. of diazotized 1-amino-2-hydroxybenzene-5-sulfonic acid and 1 mol. of 1,3-dihydroxybenzene with an agent yielding copper.

The following examples serve to illustrate the present invention, but they are not intended to limit it thereto; the parts are by weight unless stated otherwise; the relationship of parts by volume to parts by weight being that of the kilo to the liter:—

(1) 169 parts of 5-amino-acenaphthene are dissolved, while heating, in 2500 parts by volume of water and 100 parts by volume of concentrated hydrochloric acid and, while stirring, the solution is poured on to ice to which 70 parts by volume of concentrated sulfuric acid have previously been added. Thereupon, the whole is diazotized with an aqueous solution of 69 parts of sodium nitrite at a temperature of 0° C. The clarified yellow solution of the diazo-compound is slowly added at 0° C. to an aqueous solution of 212 parts of 1,3-dihydroxybenzene-5-sodium sulfonate and 250 parts of calcined sodium carbonate. After complete formation of the monoazo-dyestuff the latter is isolated, suspended in water and, while stirring, there is slowly added at 0° C. in the presence of 250 parts of calcined sodium carbonate a diazo-solution which has been obtained by diazotizing 186 parts of 2-nitraniline-4-sulfonic acid with 59 parts of sodium nitrite in the presence of 213 parts by volume of hydrochloric acid of 20° Bé. The monoazo-dyestuff gradually dissolves with formation of the disazo-dyestuff.

The finished dyestuff is isolated and dried. It is a black-brown powder which is soluble in water to a brown solution. The dyestuff corresponds with the following formula:

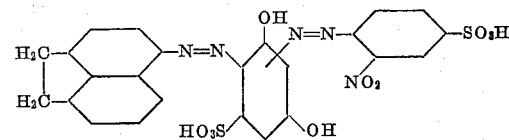

(2) 249 parts of 5-amino-acenaphthene-8-sulfonic acid are dissolved in 2500 parts by volume of water and 80 parts of calcined sodium carbonate. While stirring, the solution is caused to run into a mixture of ice and 300 parts by volume of hydrochloric acid of 20° Bé. The free sulfonic acid which is obtained in a very fine state of division is then diazotized at 0° C. with an aqueous solution of 69 parts of sodium nitrite. An aqueous solution of 110 parts of resorcinol is added to the suspension of the yellow diazo-compound thus obtained and 1500 parts by volume of a solution of sodium carbonate of 10 per cent. strength are introduced, drop by drop, at 0° C. To the solution of the monoazo-dyestuff thus obtained 150 parts of calcined sodium carbonate are added, and, thereupon, there is gradually introduced at 0° C., while stirring, a diazo-solution which has been obtained by diazotizing 195 parts of sodium sulfanilate with 69 parts of sodium nitrite in the presence of 250 parts by volume of hydrochloric acid of 20° Bé. The disazo-dyestuff is formed immediately; it is salted out by means of sodium chloride, filtered and dried. It forms a black-brown powder which is soluble in water to a brown solution.

The dyestuff has the following constitution:

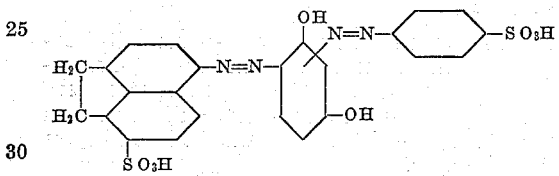

(3) The diazo-compound from 249 parts of 5-amino-acenaphthene-7-sulfonic acid (1 mol.) is gradually added at 0° C. to an aqueous solution of 55 parts of resorcinol (½ mol.) in the presence of 200 parts of sodium bicarbonate. The disazo-dyestuff is very quickly formed. To its brown solution thus obtained there is then added at 0° C. in the presence of 250 parts of caustic soda solution of 40° Bé. the diazo-compound from 109 parts of 2-nitraniline-4-sulfonic acid. After complete formation of the trisazo-dyestuff, the product is worked up as usual. The dyestuff forms a dark-brown powder which is soluble in water to a brown solution.

(4) The suspension of the diazo-compound obtained as described in Example 2 from 249 parts of 5-amino-acenaphththene-8-sulfonic acid is added gradually, while stirring at 0° C., to an aqueous solution of 126 parts of phloroglucinol and 300 parts of crystallized sodium acetate, which solution has been acidified by acetic acid. After complete coupling, there is slowly added to the solution of the monoazo-dyestuff obtained, while stirring, and at 0° C., the diazo-compound from 385 parts of para-aminoazotoluene-disulfonic acid in the presence of 400 parts of calcined sodium carbonate. The trisazo-dyestuff is quickly formed. The dyestuff is isolated and dried. It forms a black-brown powder which is soluble in water to a red-brown solution.

The following table indicates a number of other azo-dyestuffs which can be made by this invention and are also distinguished by good properties of fastness:

(1) 5-aminoacenaphthene- →resorcinol 4-sulfonic acid ←2-nitraniline-4-sulfonic acid
(2) 5-aminoacenaphthene- →resorcinol 8-sulfonic acid ←4-nitro-1,3-diamino-benzene sulfonic acid
(3) 5-aminoacenaphthene- →resorcinol 3-sulfonic acid ←ortho-aminosulfosalicylic acid (chromed)
(4) 5-aminoacenaphthene- →resorcinol 8-sulfonic acid ←1,8-aminonaphthol-3,6-disulfonic acid ← picramic acid
(5) 5-aminoacenaphthene- →resorcinol 7-sulfonic acid ←benzidine→salicylic acid
(6) 5-aminoacenaphthene- →resorcinol 8-sulfonic acid ←2-nitraniline-4-sulfonic acid
(7) 5-aminoacenaphthene- →resorcinol 8-sulfonic acid ←5-aminoacenaphthene-8-sulfonic acid
(8) 5-aminoacenaphthene- →resorcinol 4-sulfonic acid ←sulfanilic acid
(9) 5-aminoacenaphthene- →resorcinol 3-sulfonic acid ←para-aminosulfosalicylic acid
(10) 5-aminoacenaphthene- →resorcinol 7-sulfonic acid ←5-aminoacenaphthene-7-sulfonic acid
(11) 5-aminoacenaphthene- →resorcinol ←sulfanilic acid (oxidized)
(12) 5-aminoacenaphthene- →resorcinol 8-sulfonic acid ←2-naphthylamine-6,8-disulfonic acid
(13) 5-aminoacenaphthene- →resorcinol 8-sulfonic acid ←picramic acid
(14) 5-aminoacenaphthene- →resorcinol 8-sulfonic acid ←4-aminodiphenylamine-2-sulfonic acid
(15) 5-aminoacenaphthene- →resorcinol 8-sulfonic acid ←2-aminophenol-4-sulfonic acid (copper compound)
(16) 5-aminoacenaphthene- →1,3-dihydroxy-benzene-4-carboxylic acid ←1,3-diamino-4-nitrobenzene
(17) 5-aminoacenaphthene- →1,3-dihydroxy-benzene-4-carboxylic acid ←4-nitraniline-2-sulfonic acid
(18) 5-aminoacenaphthene- →1,3-dihydroxy-benzene-5-carboxylic acid ←aniline-2,4-disulfonic acid
(19) 5-aminoacenaphthene- →pyrocatechol 7-sulfonic acid ←2-naphthylamine 6,8-disulfonic acid
(20) 5-aminoacenaphthene- →resorcinol 8-sulfonic acid ←meta-toluidine ← 6-chloro-2-toluidine-4-sulfonic acid
(21) 5-aminoacenaphthene- →resorcinol 8-sulfonic acid ←1-naphthylamine-6-sulfonic acid ← sulfanilic acid
(22) 5-aminoacenaphthene- →resorcinol 8-sulfonic acid ←4-aminodiphenylamine-2-sulfonic acid ←picramic acid The dyestuffs obtained dye leather yellow-brown to black-brown tints.

We claim:
1. The water-soluble azo-dyestuffs of the following general formula:

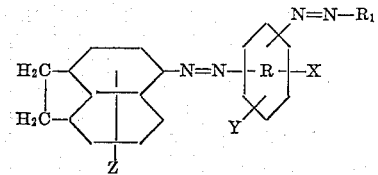

wherein the benzene nucleus R contains at least two hydroxy groups, R₁ means a member of the group consisting of radicals of the benzene, naphthalene, diphenyl and acenaphthene series, X stands for one of the group consisting of hydrogen and the radical —N=N—R₁, Y for one of the group consisting of hydrogen, sulfonic acid and carboxylic acid, Z stands for one of the group consisting of hydrogen and sulfonic acid, and wherein the dyestuff contains at least one sulfonic acid group, being yellow-brown to black-brown powders which are soluble in water and dye leather yellow-brown to black-brown shades of good fastness properties.

2. The water-soluble azo-dyestuffs of the following general formula:

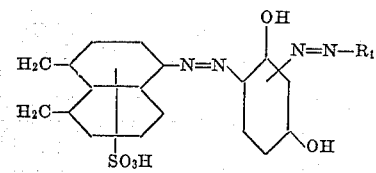

wherein R₁ means a member of the group consisting of radicals of the benzene, naphthalene, diphenyl and acenaphthene series, being yellow-brown to black-brown powders which are soluble in water and dye leather yellow-brown to black-brown shades of good fastness properties.

3. The water-soluble azo-dyestuff of the following formula:

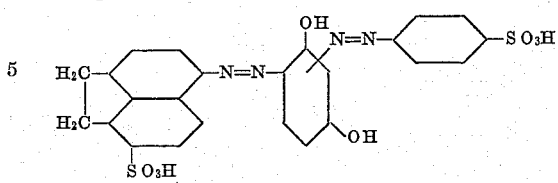

being a black-brown powder which is soluble in water to a brown solution and dyes leather brown shades of good fastness properties.

4. The water-soluble azo-dyestuff of the following formula:

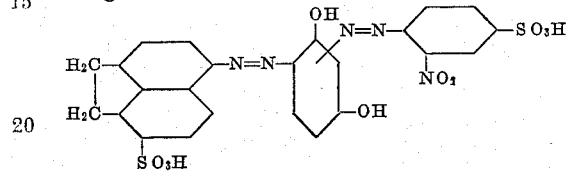

being a black-brown powder which is soluble in water to a brown solution and dyes leather havana-brown shades of good fastness properties.

5. The water-soluble azo-dyestuff of the following formula:

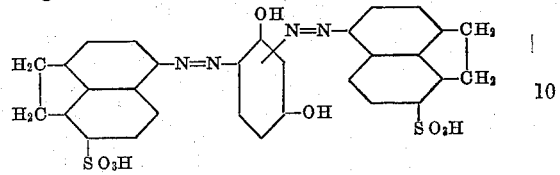

being a brown powder which is soluble in water to a brown solution and dyes leather brown shades of good fastness properties.

ERICH FISCHER.
RICHARD HUSS.